(12) United States Patent
Rofougaran

(10) Patent No.: US 8,121,557 B2
(45) Date of Patent: *Feb. 21, 2012

(54) CONFIGURABLE RF SECTIONS FOR RECEIVER AND TRANSMITTER AND METHODS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 578 days.

This patent is subject to a terminal disclaimer.

(21) Appl. No.: 12/326,229

(22) Filed: Dec. 2, 2008

(65) Prior Publication Data

US 2010/0136922 A1 Jun. 3, 2010

(51) Int. Cl.
*H04B 1/44* (2006.01)

(52) U.S. Cl. .................. 455/78; 455/83; 455/86; 455/88

(58) Field of Classification Search .................... 455/78, 455/83, 86, 88
See application file for complete search history.

(56) References Cited

U.S. PATENT DOCUMENTS

2007/0141998 A1* 6/2007 Zolfaghari ...................... 455/78
* cited by examiner

*Primary Examiner* — Lincoln Donovan
*Assistant Examiner* — John Poos
(74) *Attorney, Agent, or Firm* — Garlick Harrison & Markison; Bruce E. Stuckman

(57) ABSTRACT

A transceiver includes an RF receiver section having a plurality of RF receiver stages configured in parallel, and a configurable RF transmitter section. The plurality of RF receiver stages are selectively enabled in response to a control signal. The configurable RF transmitter section is configured to operate in one of: a mixed signal mode of operation and a phase modulation mode of operation, in response to the control signal.

17 Claims, 14 Drawing Sheets

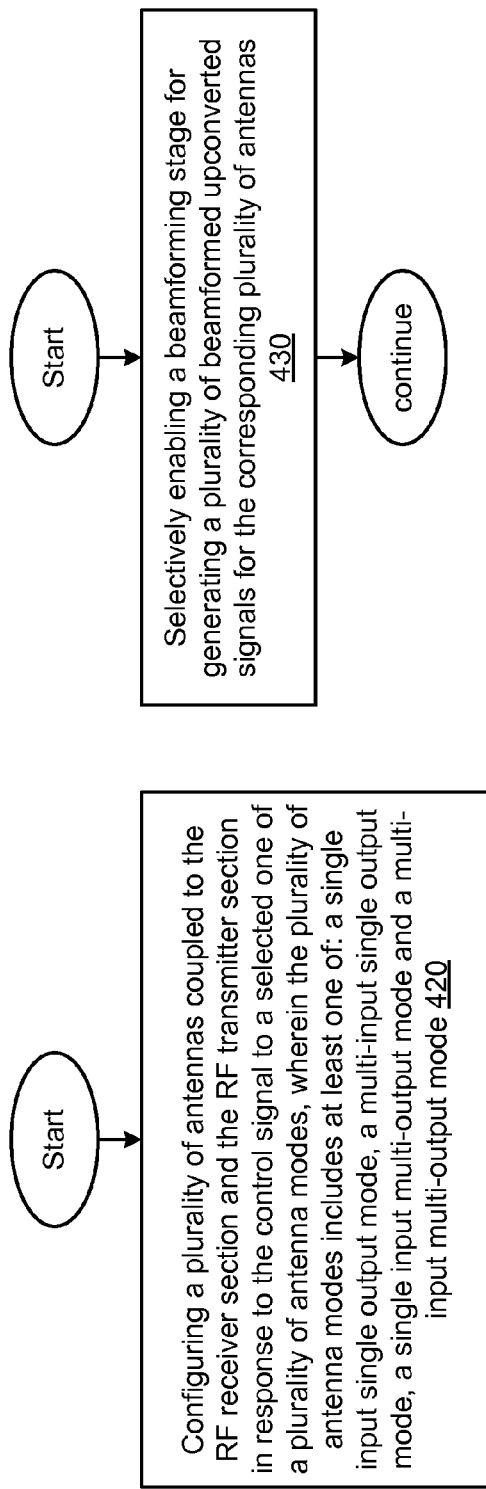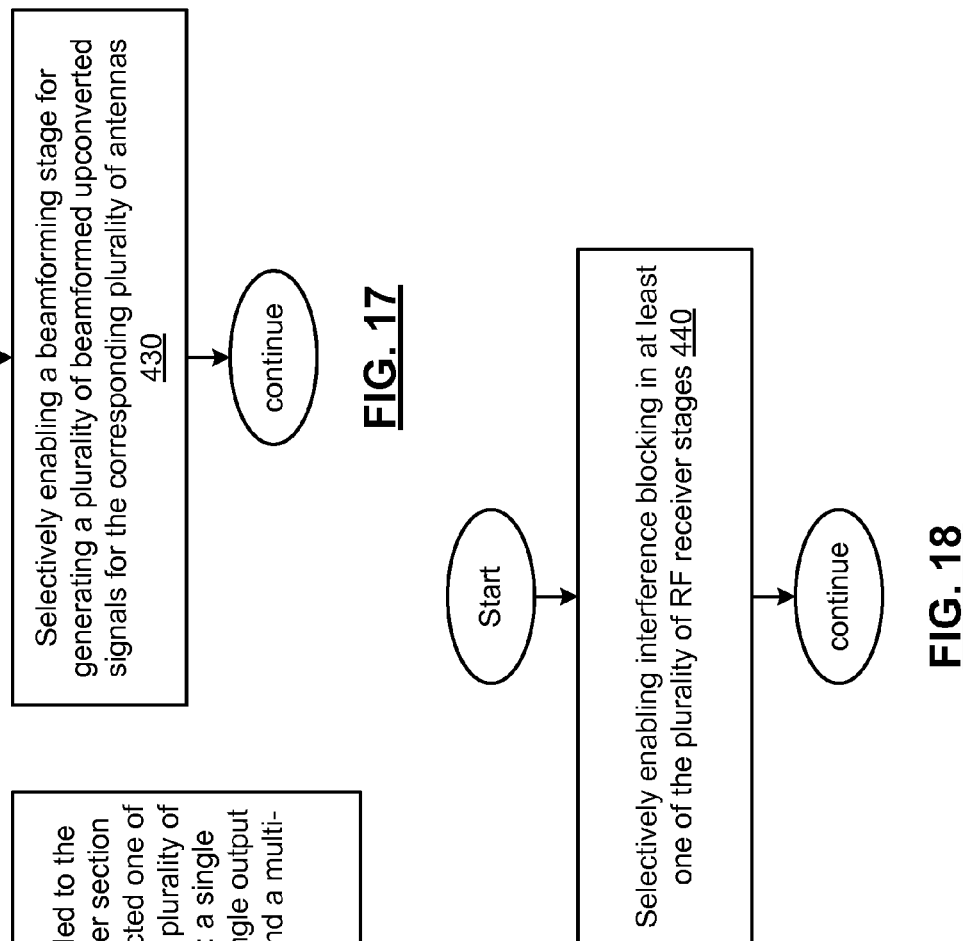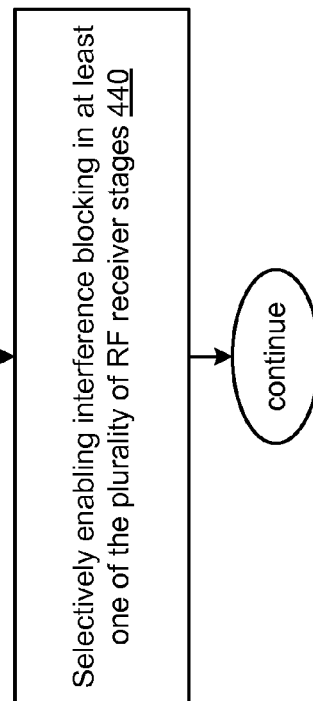

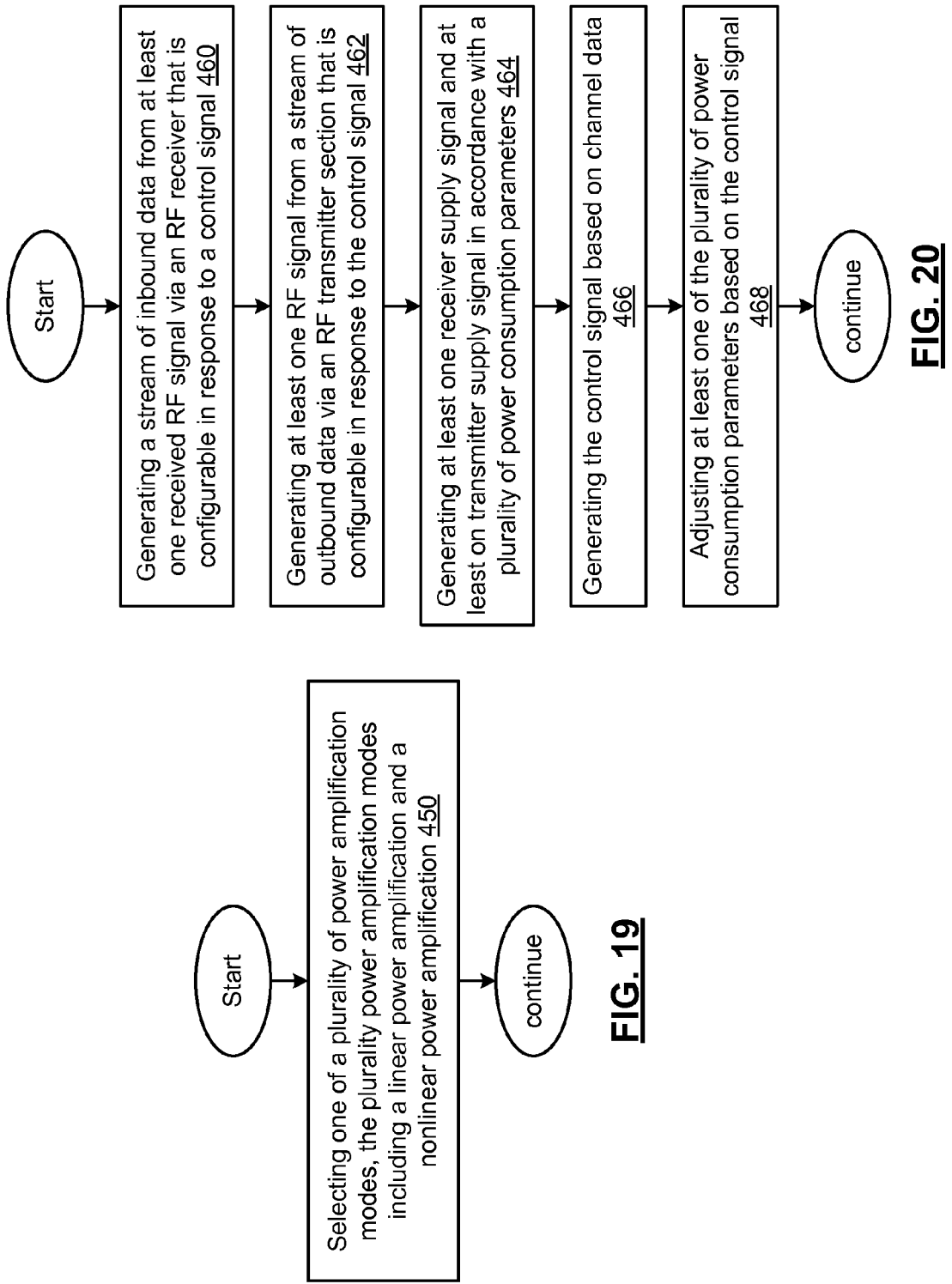

CONFIGURABLE RF SECTIONS FOR RECEIVER AND TRANSMITTER AND METHODS FOR USE THEREWITH

CROSS-REFERENCE TO RELATED APPLICATIONS

The present application is related to copending applications:

Ser. No. 12/326,220, entitled, CONFIGURABLE BASEBAND PROCESSING FOR RECEIVER AND TRANSMITTER AND METHODS FOR USE THEREWITH, filed on Dec. 2, 2008;

Ser. No. 12/326,255, entitled, CONFIGURATION CONTROLLER FOR RECEIVER AND TRANSMITTER, filed on Dec. 2, 2008;

Ser. No. 12/326,320, entitled, POWER MANAGEMENT UNIT FOR CONFIGURABLE RECEIVER AND TRANSMITTER AND METHODS FOR USE THEREWITH, filed on Dec. 2, 2008;

the contents of which are incorporated herein by reference thereto.

BACKGROUND OF THE INVENTION

1. Technical Field of the Invention

This invention relates generally to communication devices and more particularly to the communication devices that communicate with multiple networks in multiple frequency bands.

2. Description of Related Art

Wireless communication systems are known to support wireless communications between wireless communication devices affiliated with the system. Such wireless communication systems range from national and/or international cellular telephone systems to point-to-point in-home wireless networks. Each type of wireless communication system is constructed, and hence operates, in accordance with one or more standards. Such wireless communication standards include, but are not limited to IEEE 802.11, 802.15, 802.16, long term evolution (LTE), Bluetooth, advanced mobile phone services (AMPS), digital AMPS, global system for mobile communications (GSM), code division multiple access (CDMA), wireless application protocols (WAP), local multi-point distribution services (LMDS), multi-channel multi-point distribution systems (MMDS), and/or variations thereof.

An IEEE 802.11 compliant wireless communication system includes a plurality of client devices (e.g., laptops, personal computers, personal digital assistants, etc., coupled to a station) that communicate over a wireless link with one or more access points. As is also generally understood in the art, many wireless communications systems employ a carrier-sense multiple access (CSMA) protocol that allows multiple communication devices to share the same radio spectrum. Before a wireless communication device transmits, it "listens" to the wireless link to determine if the spectrum is in use by another station to avoid a potential data collision. In other systems, transmissions can be scheduled using management frames or power save multi-poll (PSMP), for example. In many cases, the transmitting device (e.g., a client device or access point) transmits at a fixed power level regardless of the distance between the transmitting device and a targeted device (e.g., station or access point). Typically, the closer the transmitting device is to the targeted device, the less error there will be in the reception of the transmitted signal.

A cognitive radio is a wireless communication device that can adjust transmission or reception parameters to communicate efficiently to avoiding interference. This alteration of parameters can be based on the active monitoring of several factors in the external and internal radio environment, such as radio frequency spectrum, user behavior and network state.

When one or more of these communication devices is mobile, its transmit and receive characteristics can change with the motion of the device, as it moves closer or farther from a device it is communication with, and as the transmission environment changes due to the devices position with respect to reflecting members, interfering stations, noise sources, etc.

The limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

Figure 3:
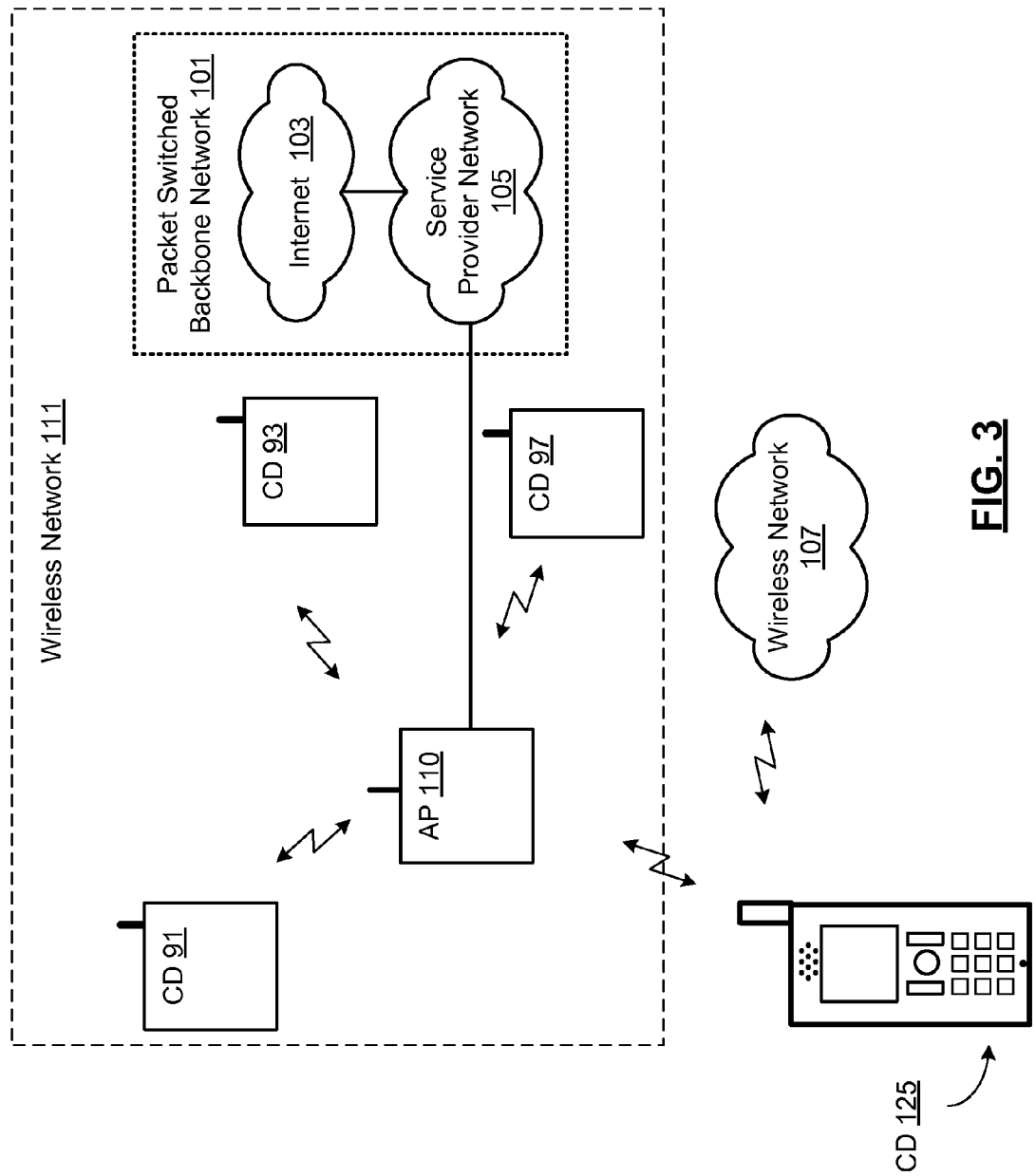

FIG. 3 presents a pictorial representation of a wireless network 111 and 107 in accordance with an embodiment of the present invention.

Figure 4:
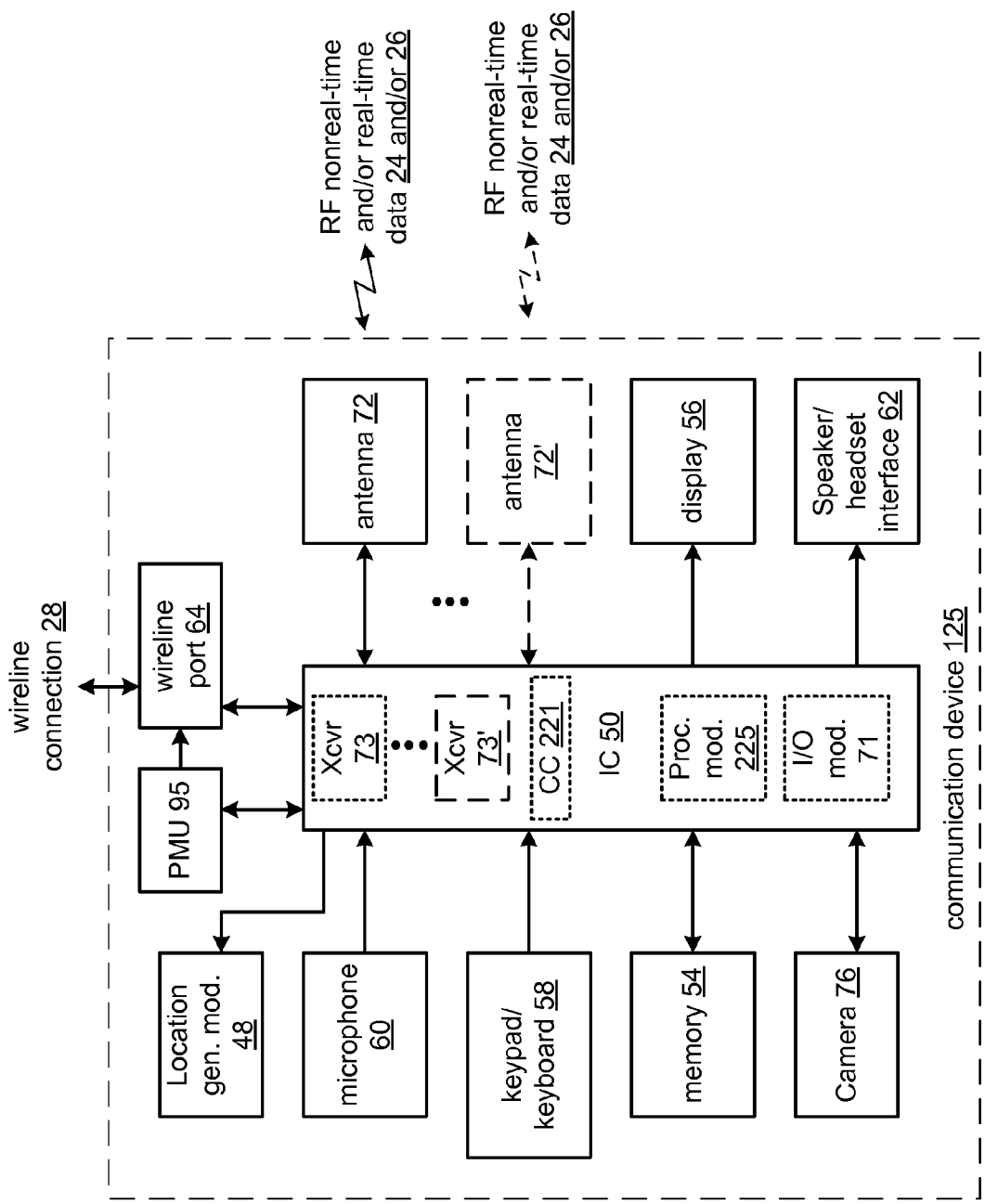
Figure 5:
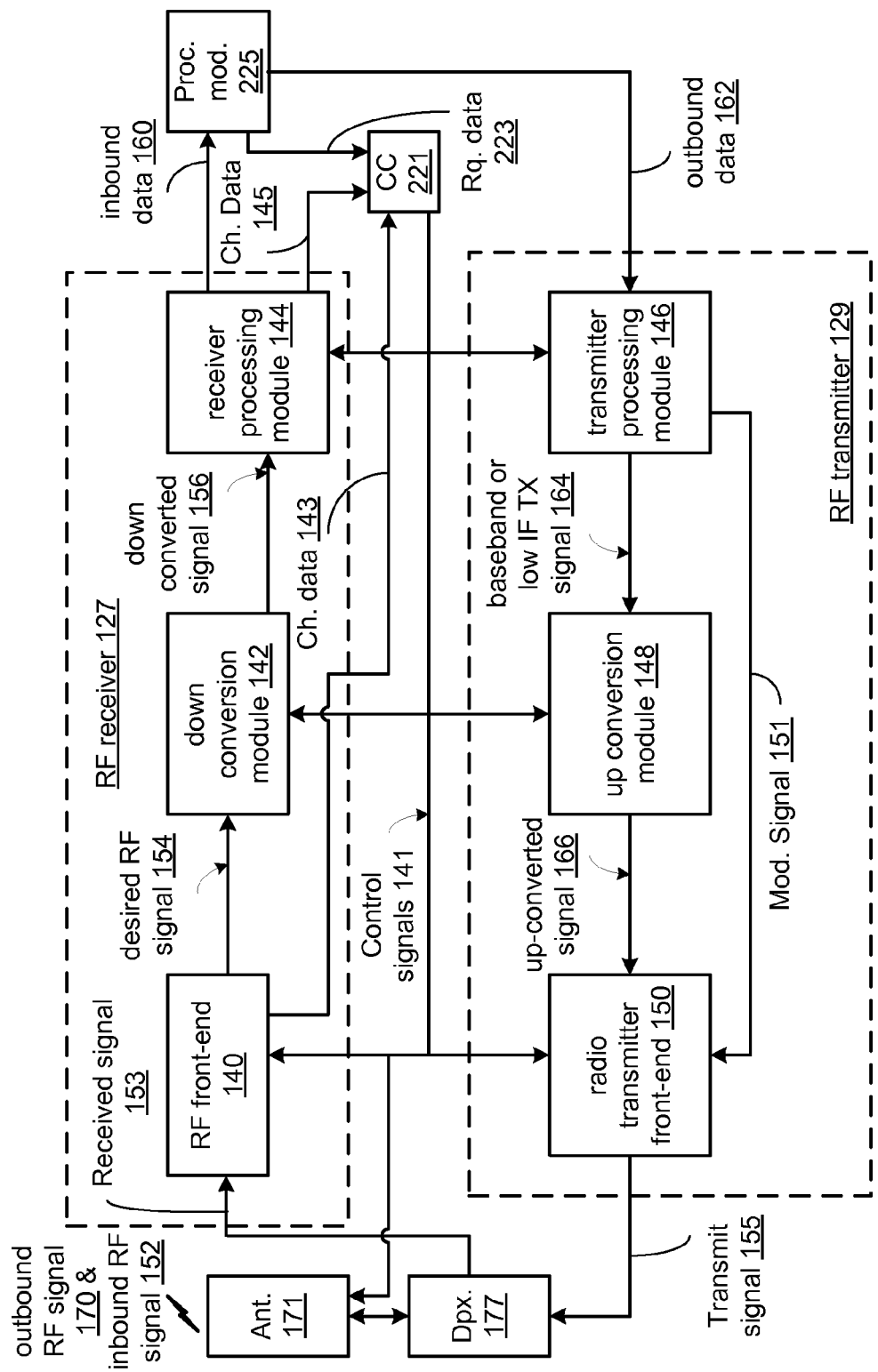
Figure 6:
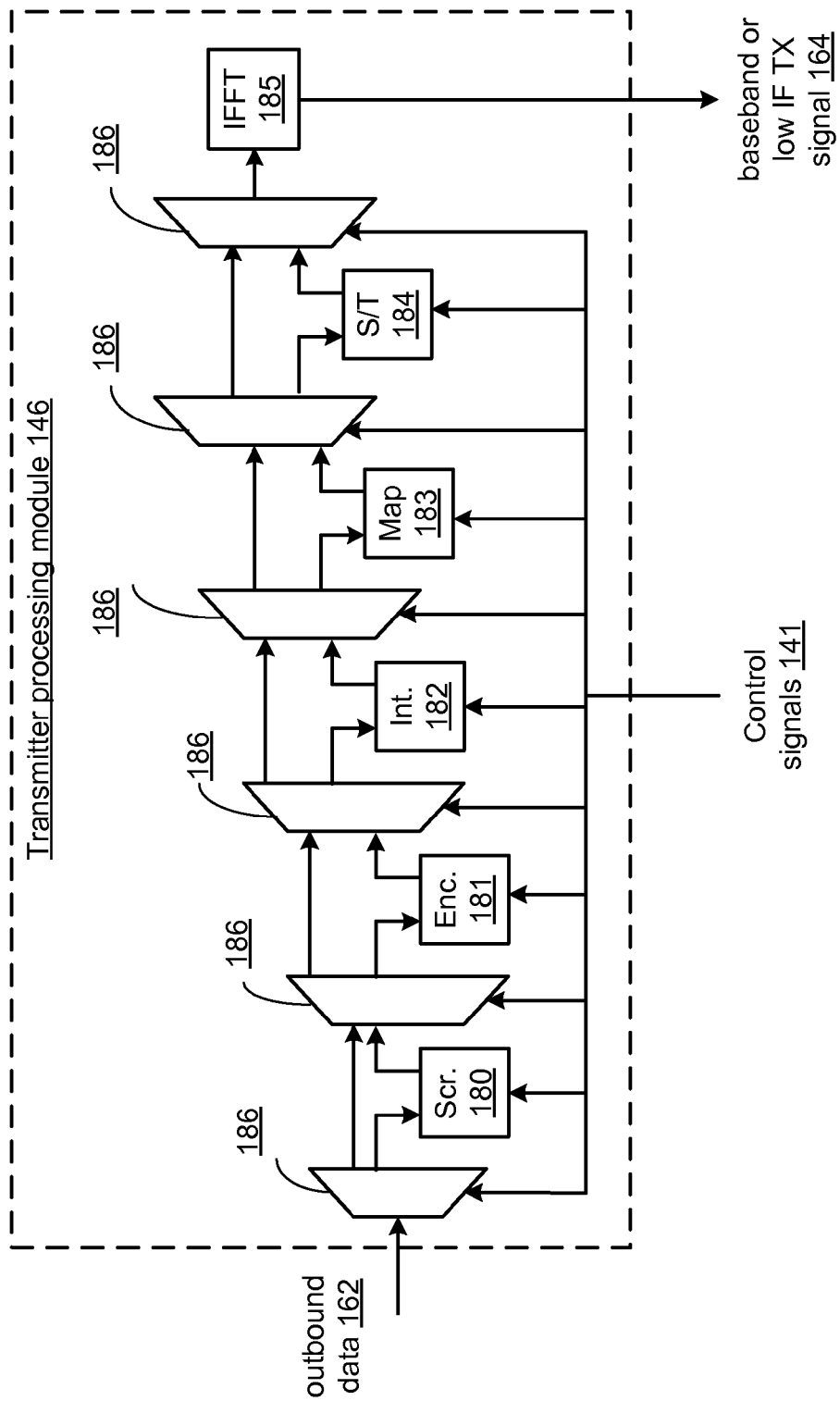
Figure 7:
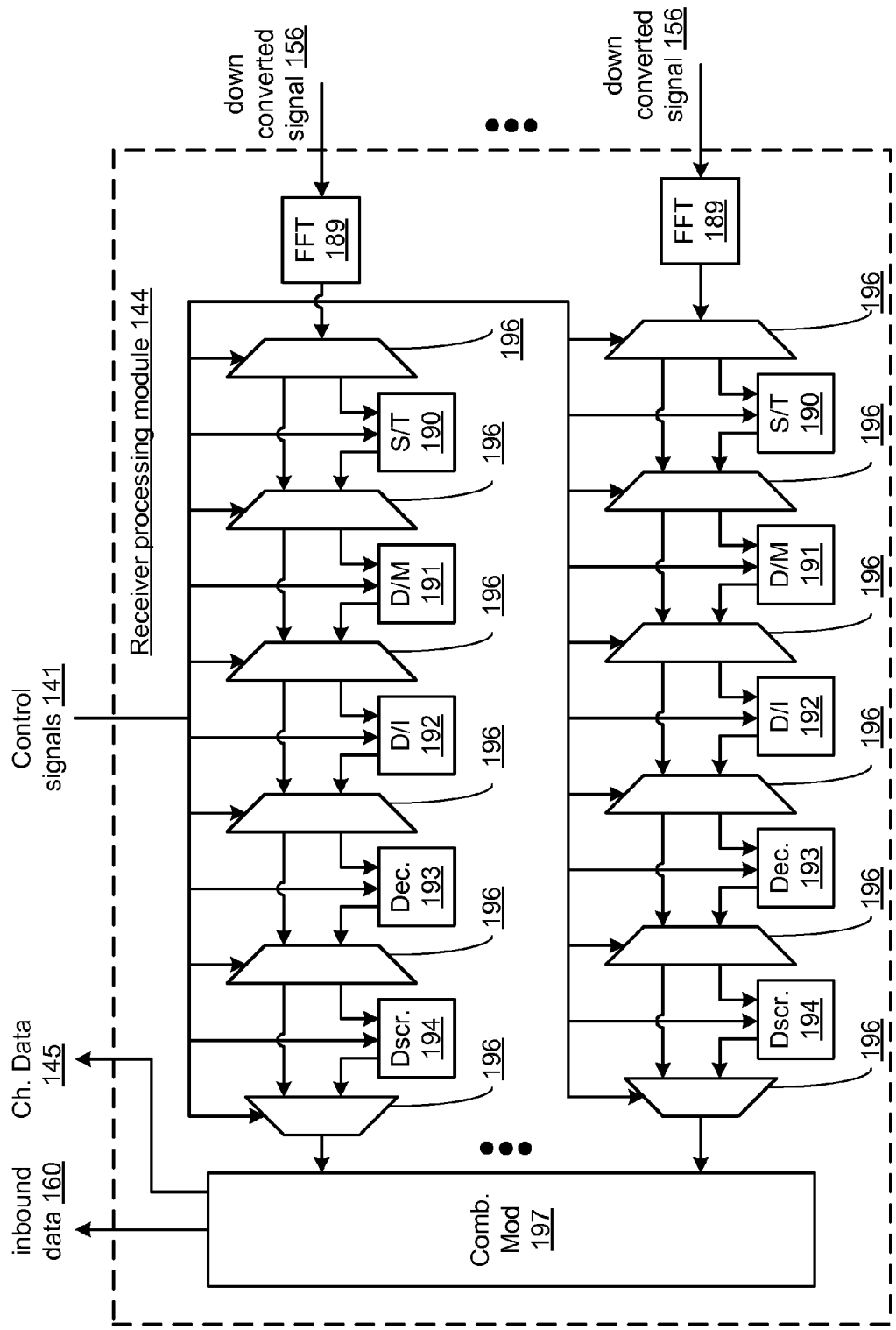
Figure 8:
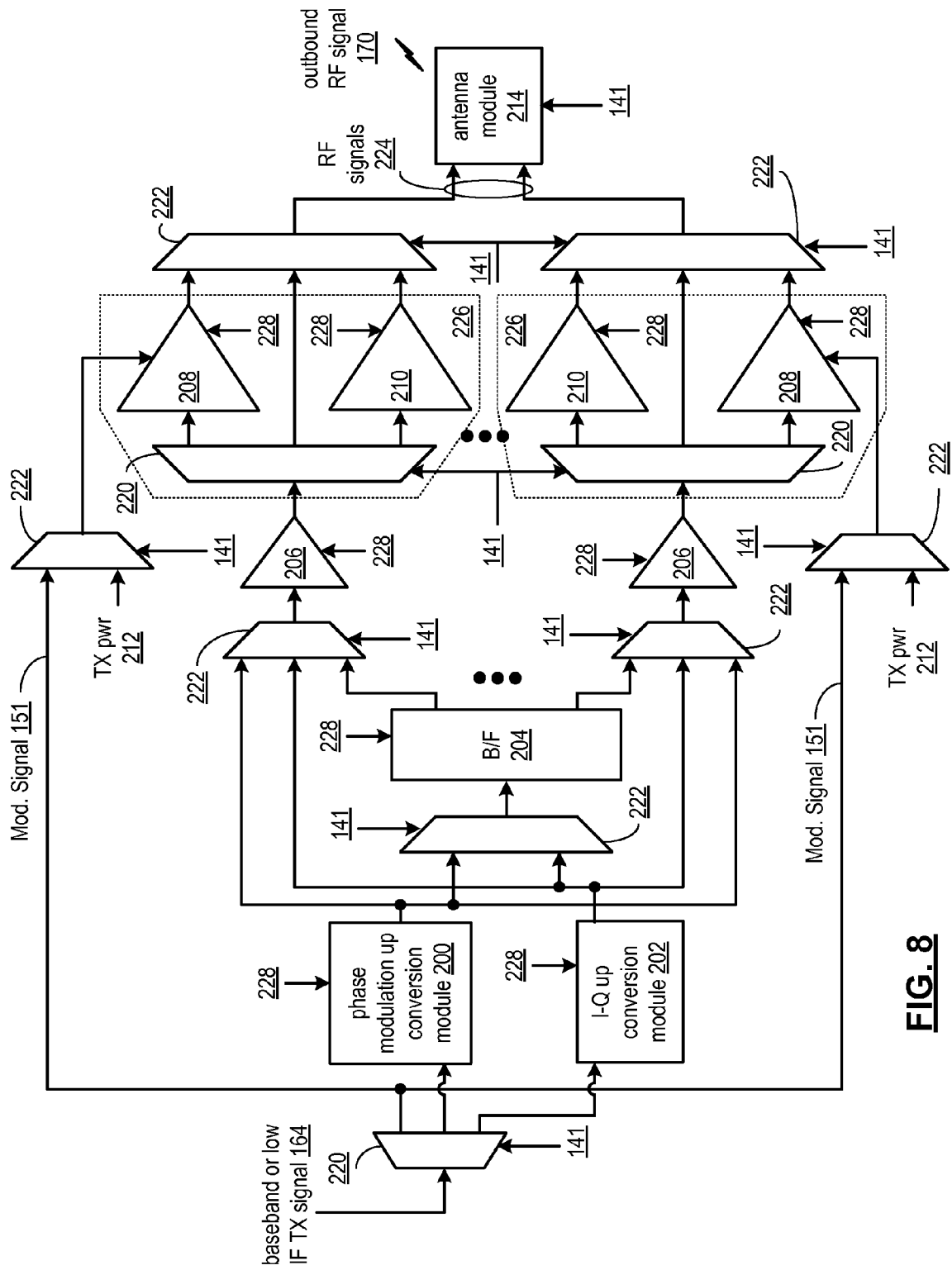
Figure 9:
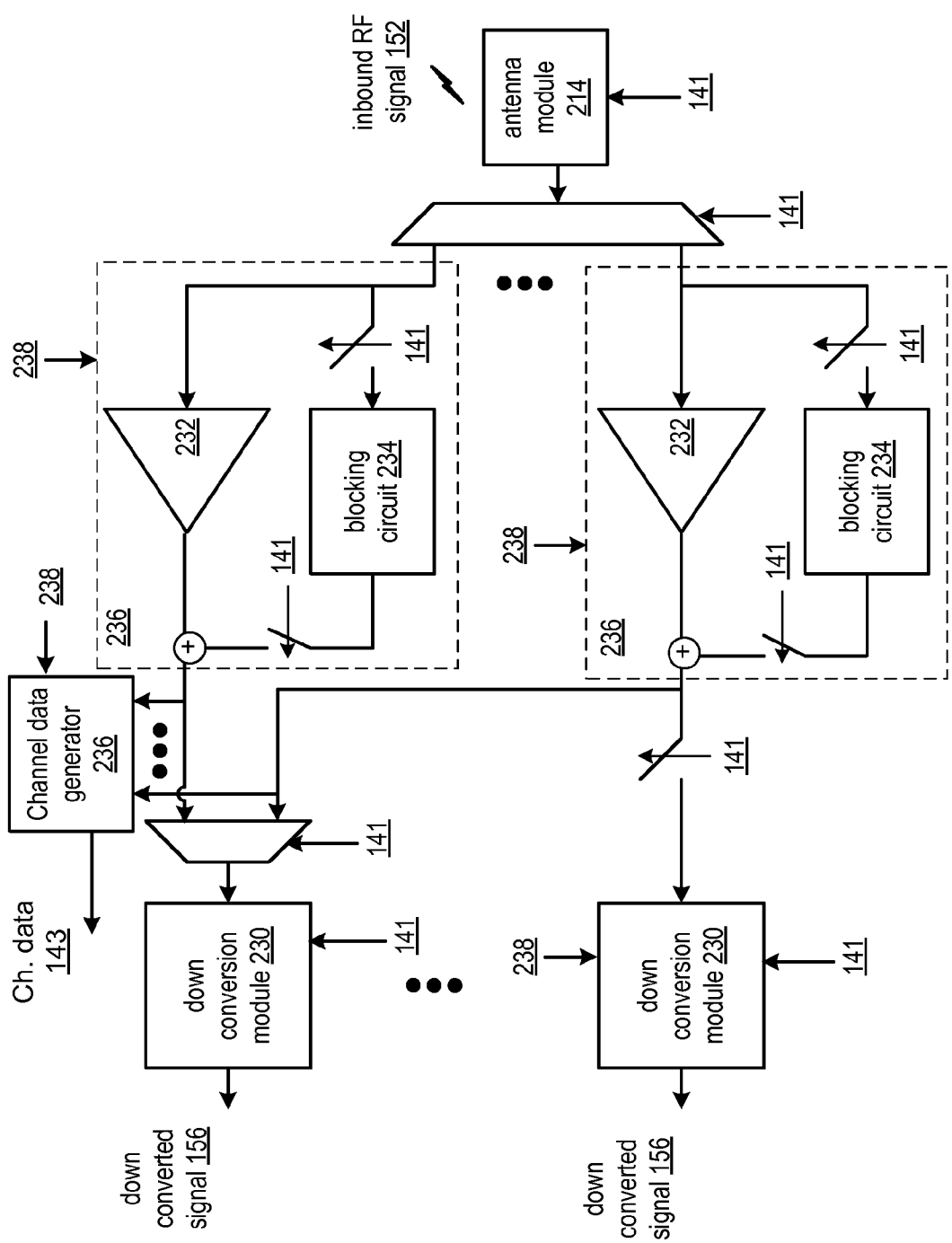
Figure 11:
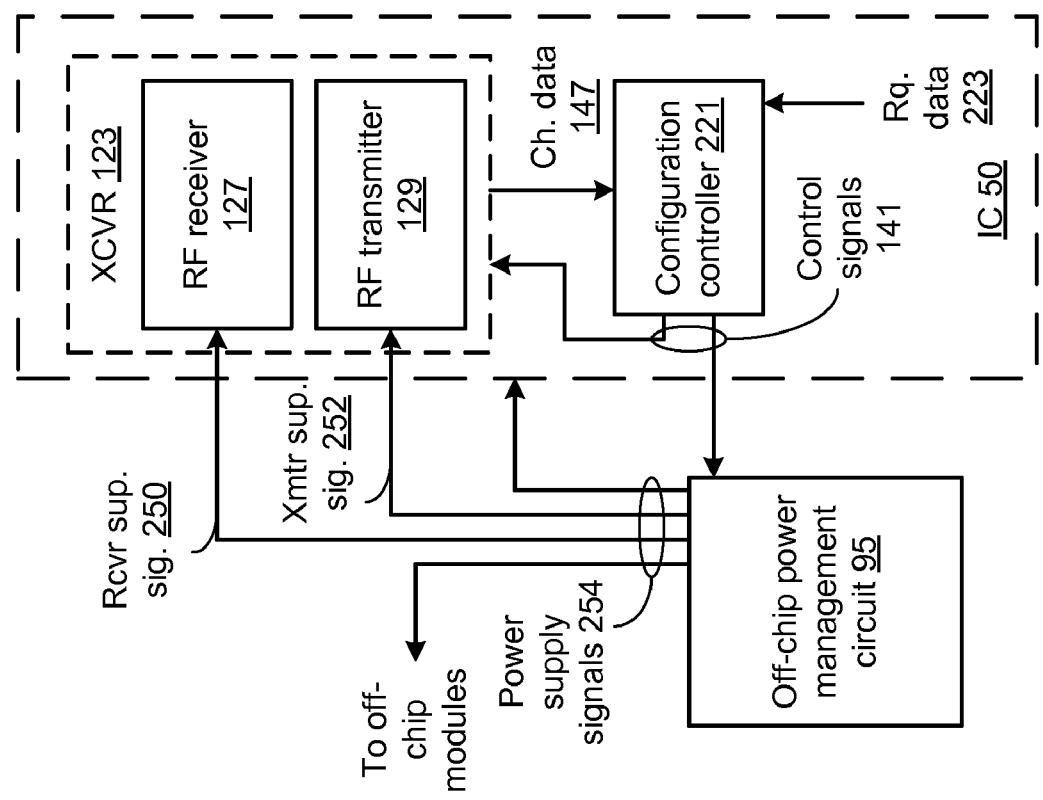
Figure 10:
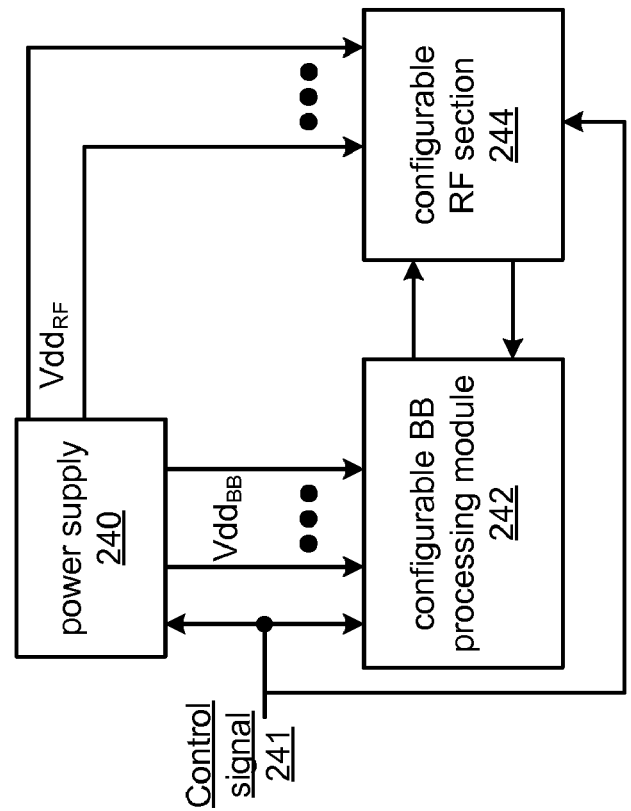
Figure 13:
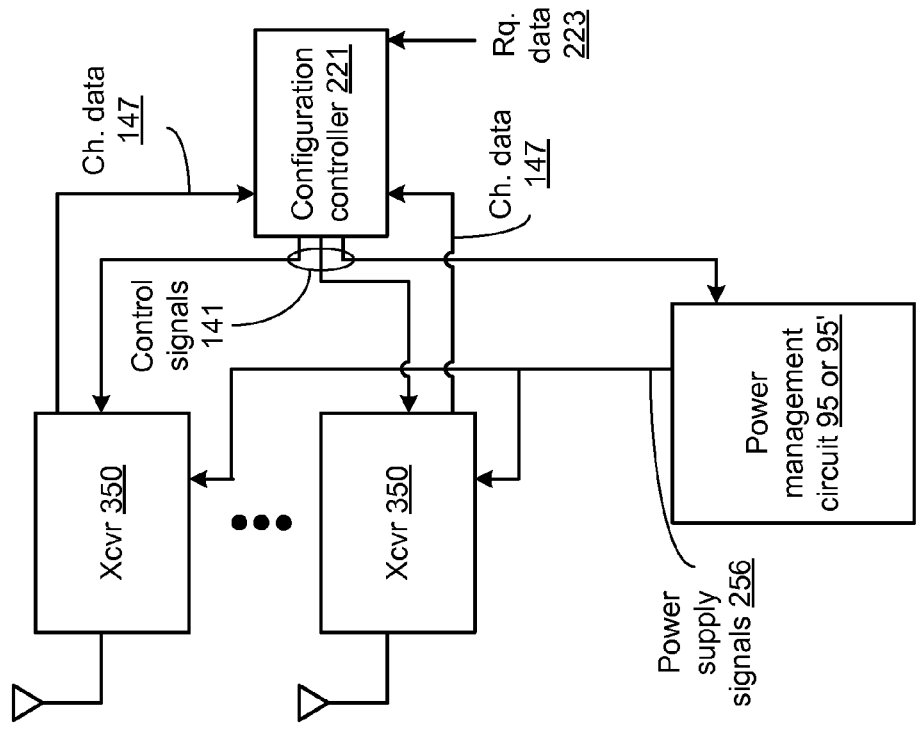
Figure 12:
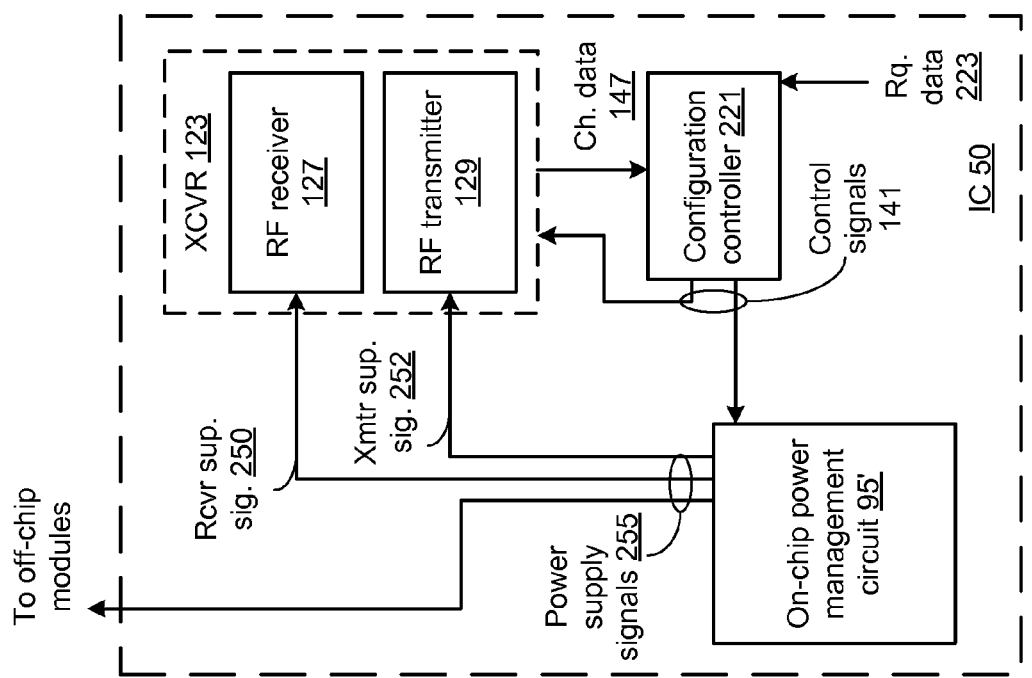
Figure 15:
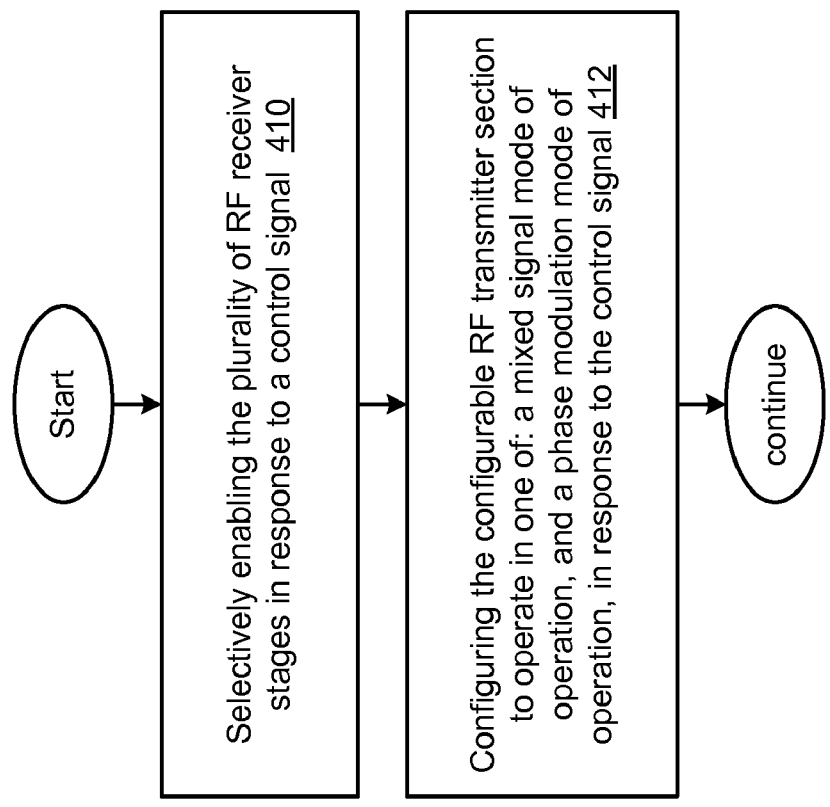
Figure 14:
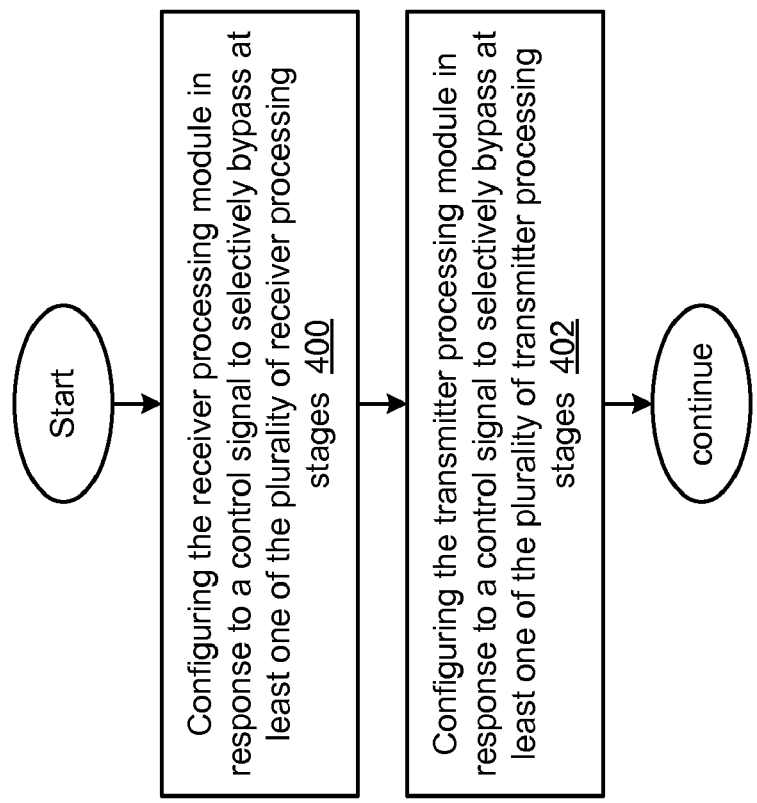

FIG. 4 is a schematic block diagram of an embodiment of a communication device 125 in accordance with the present invention;

FIG. 5 is a schematic block diagram of an embodiment of an RF transceiver 123 in accordance with the present invention;

FIG. 6 is a schematic block diagram of an embodiment of a transmitter processing module 146 in accordance with the present invention;

FIG. 7 is a schematic block diagram of an embodiment of a receiver processing module 144 in accordance with the present invention;

FIG. 8 is a schematic block diagram of an embodiment of a RF transmitter section in accordance with the present invention;

FIG. 9 is a schematic block diagram of an embodiment of a RF receiver section in accordance with the present invention;

FIG. 10 is a schematic block diagram of an embodiment of a configurable power supply in accordance with the present invention;

FIG. 11 is a schematic block diagram of an embodiment of a power management unit in accordance with the present invention;

FIG. 12 is a schematic block diagram of another embodiment of a power management unit in accordance with the present invention;

FIG. 13 is a schematic block diagram of another embodiment of a power management unit in accordance with the present invention;

FIG. 14 is a flow chart of an embodiment of a method in accordance with the present invention;

FIG. 15 is a flow chart of an embodiment of a method in accordance with the present invention;

FIG. 16 is a flow chart of an embodiment of a method in accordance with the present invention;

FIG. 17 is a flow chart of an embodiment of a method in accordance with the present invention;

FIG. 18 is a flow chart of an embodiment of a method in accordance with the present invention;

FIG. 19 is a flow chart of an embodiment of a method in accordance with the present invention; and FIG. 20 is a flow chart of an embodiment of a method in accordance with the present invention.

DETAILED DESCRIPTION OF THE INVENTION

Figure 1:
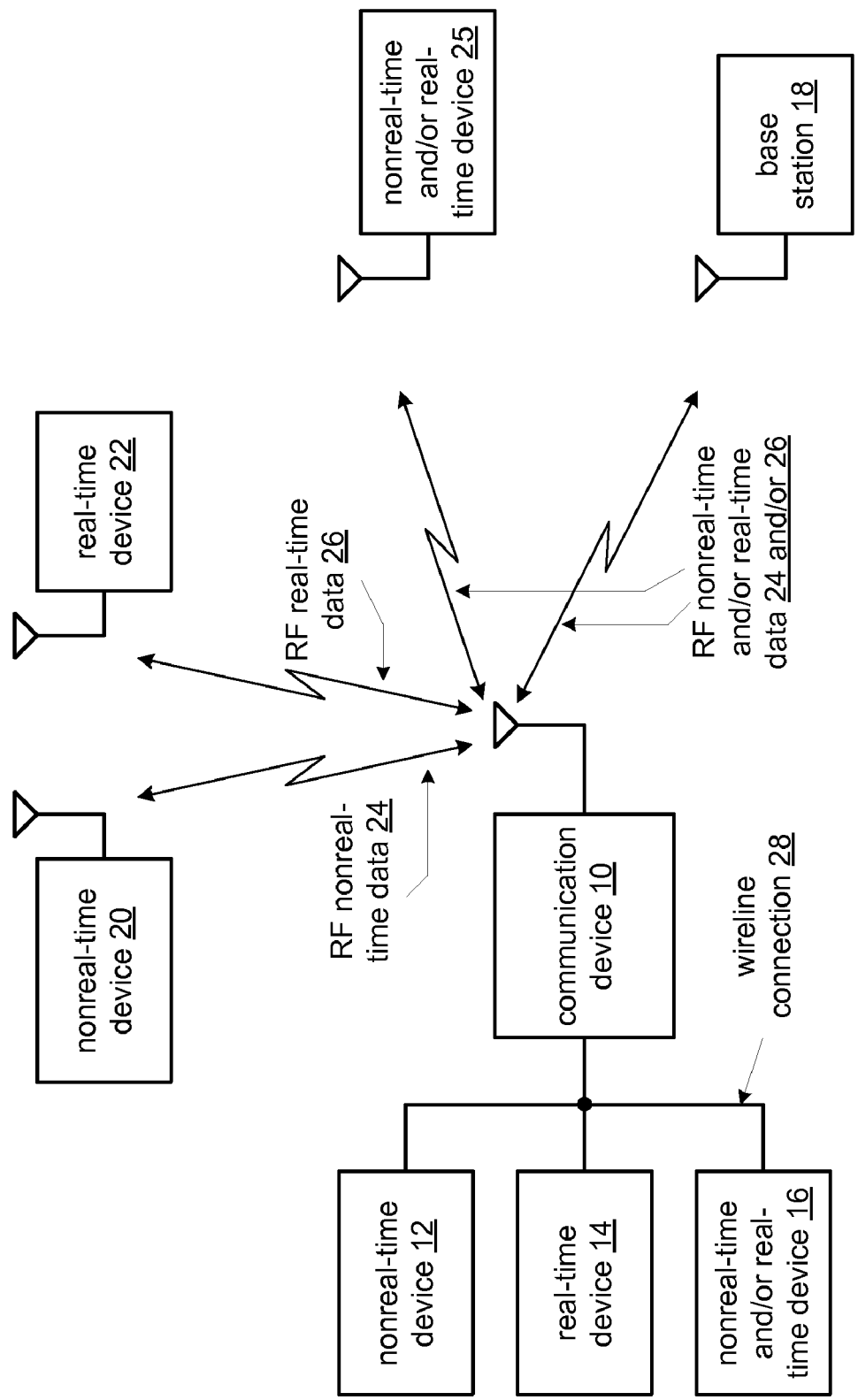
FIG. 1 is a schematic block diagram of an embodiment of a communication system in accordance with the present invention.

FIG. 1 is a schematic block diagram of an embodiment of a communication system in accordance with the present invention. In particular a communication system is shown that includes a communication device 10 that communicates real-time data 24 and/or non-real-time data 26 wirelessly with one or more other devices such as base station 18, non-real-time device 20, real-time device 22, and non-real-time and/or real-time device 25. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connections can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), WCDMA, LTE or other mobile wireless protocol or other wireless communication protocol, either standard or proprietary. Further, the wireless communication paths can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, game device, personal computer, laptop computer, wireless display or other device that performs one or more functions that include communication of voice and/or data via wireline connection 28 and/or the wireless communication paths. In an embodiment of the present invention, the real-time and non-real-time devices 12, 14 16, 18, 20, 22 and 25 can be base stations, access points, terminals, personal computers, laptops, PDAs, storage devices, cable replacements, bridge/hub devices, wireless HDMI devices, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, communication device 10 can be a multiservice device that is capable of communicating real time and/or non-real-time data wirelessly with multiple networks either contemporaneously or non-contemporaneously. This multiservice functionality can include the ability to engage in communications over multiple networks, to choose the best network or have the best network chosen for it for engaging in a particular communication. For example, communication device 10 wishing to place a telephone call may launch a traditional telephone call with a remote caller over a cellular telephone network via a cellular voice protocol, a voice over IP call over a data network via a wireless local area network protocol, or on a peer-to-peer basis with another communication device via a Bluetooth protocol. In another example, communication device 10 wishing to access a video program might receive a streaming video signal over a cellular telephone network via a cellular data protocol, receive a direct broadcast video signal, download a podcast video signal over a data network via a wireless local area network protocol, etc.

In an embodiment of the present invention, the communication device 10 includes an integrated circuit, such as an RF integrated circuit that includes one or more features or functions of the present invention. Such integrated circuits shall be described in greater detail in association with FIGS. 3-20 that follow.

Figure 2:
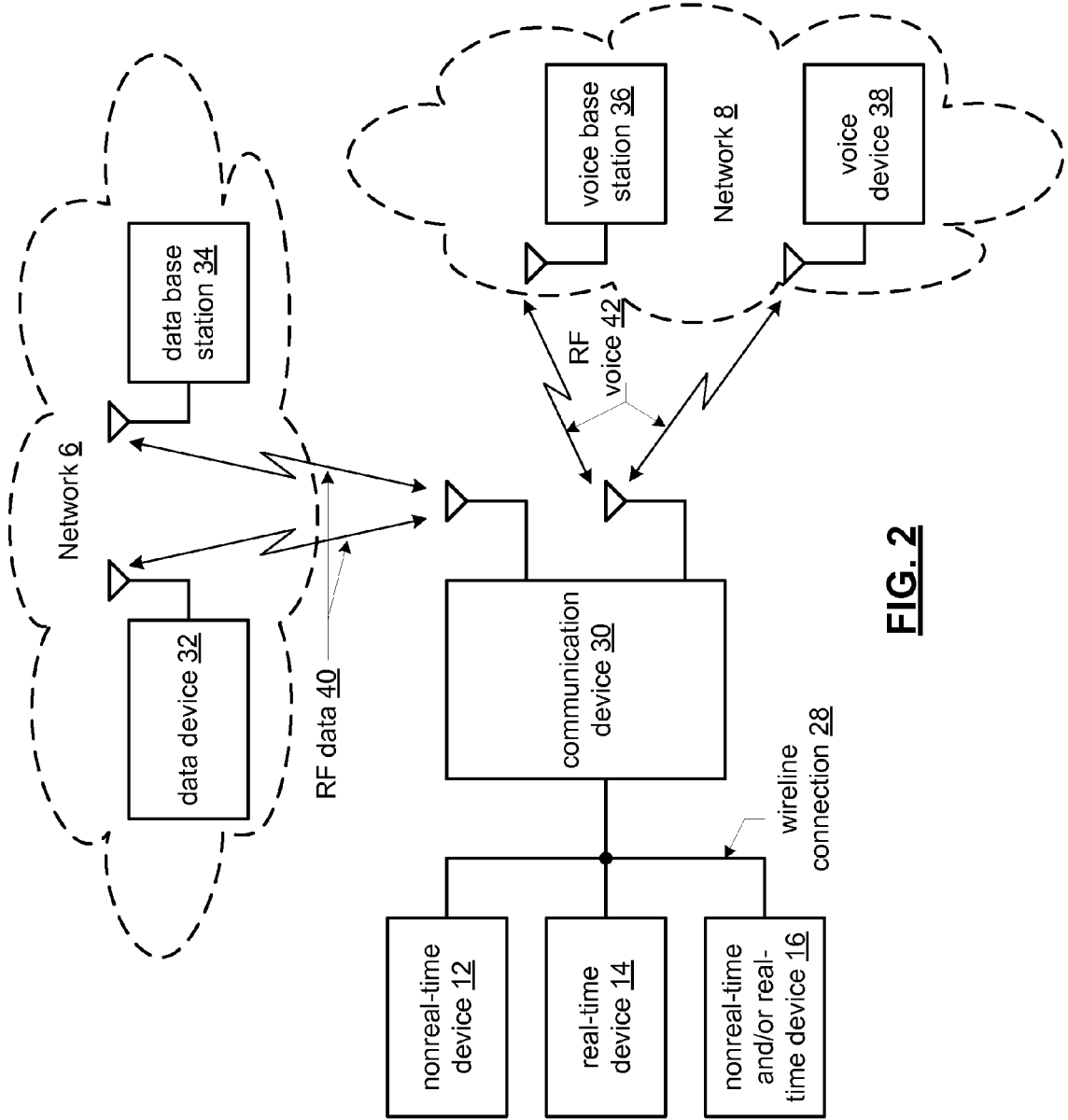
FIG. 2 is a schematic block diagram of an embodiment of another communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two or more separate wireless transceivers for communicating, contemporaneously, via two or more wireless communication protocols with data device 32 and/or data base station 34 of network 6 via RF data 40 and voice base station 36 and/or voice device 38 of network 8 via RF voice signals 42.

FIG. 3 presents a pictorial representation of wireless networks 111 and 107 in accordance with an embodiment of the present invention. The wireless network 111, includes an access point 110 that is coupled to packet switched backbone network 101. The access point 110 manages communication flow over the wireless network 111 destined for and originating from each of communication devices 91, 93, 97 and 125. Via the access point 110, each of the communication devices 91, 93, 97 and 125 can access service provider network 105 and Internet 103 to, for example, surf web-sites, download audio and/or video programming, send and receive messages such as text messages, voice message and multimedia messages, access broadcast, stored or streaming audio, video or other multimedia content, play games, send and receive telephone calls, and perform any other activities, provided directly by access point 110 or indirectly through packet switched backbone network 101.

One or more of the communication devices 91, 93, 97 and 125, such as communication device 125 is a mobile device that can include the functionality of communication devices 10 or 30. In addition, communication device 125 can optionally engage in communications via one or more other networks 107 as discussed in conjunction with FIGS. 1 and 2.

FIG. 4 is a schematic block diagram of an embodiment of a communication device 125 in accordance with the present invention. In particular, integrated circuit (IC) 50 is shown that implements communication device 125 in conjunction with microphone 60, keypad/keyboard 58, memory 54, speaker/headset interface 62, display 56, camera 76, antennas 72 . . . 72', and wireline port 64. In operation, IC 50 includes a plurality of wireless transceivers such as transceivers 73 and 73' having RF and baseband modules for sending and receiving data such as RF real-time data 26 and non-real-time data 24 and transmitting via antennas 72 . . . 72'. Each antenna can be a fixed antenna, a single-input single-output (SISO) antenna, a multi-input multi-output (MIMO) antenna, a diversity antenna system, an antenna array that allows the beam shape, gain, polarization or other antenna parameters to be controlled or other antenna configuration. In addition, IC 50 includes input/output module 71 that includes the appropriate interfaces, drivers, encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

In operation, the RF transceivers 73 . . . 73' generate outbound RF signals from outbound data and generate inbound data from inbound RF signals to communicate with a plurality of networks, such as networks 6, 8, 107 and 111, etc. Configuration controller 221 configures one or more of the transceivers 73 . . . 73', the antennas 72 . . . 72' and the power management unit 95 to conform to channel conditions, the particular transmission requirements of data being sent and received by the transceivers 73 . . . 73' in order to conserve power, reduce interference, and to communicate more efficiently with one or more networks or remote devices.

Power management circuit (PMU) 95 includes one or more DC-DC converters, voltage regulators, current regulators or other power supplies for supplying the IC 50 and optionally the other components of communication device 10 and/or its peripheral devices with supply voltages and or currents (collectively power supply signals) that may be required to power these devices. Power management circuit 95 can operate from one or more batteries, line power, an inductive power received from a remote device, a piezoelectric source that generates power in response to motion of the integrated circuit and/or from other power sources, not shown. In particular, power management module 95 can selectively supply power supply signals of different voltages, currents or current limits or with adjustable voltages, currents or current limits in response to control signals received from configuration controller. While shown as an off-chip module, PMU 95 can be alternatively implemented as an on-chip circuit.

In addition, IC 50 may include an location generation module 48 that generates location or motion parameters based on the location or motion of the device such as a longitude, latitude, altitude, address, velocity, velocity vector, acceleration (including deceleration), and/or other location or motion parameter. Location generation module 48 can include a global positioning system (GPS) receiver, one or more accelerometers, gyroscopes or positioning sensors, a device that operates via triangulation data received via the network, or other location generation devices that generate or receive such location or motion parameters.

In an embodiment of the present invention, the IC 50 is a system on a chip integrated circuit that includes at least one processing device. Such a processing device, for instance, processing module 225, may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the IC 50 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

Also note that while certain modules of communication device 125 are shown to be included on IC 50 while others are not, IC 50 is shown for illustrative purposes and may include more or less of the modules of communication device 125, depending on the particular implementation. Further, communication device 125 can include additional modules or fewer modules than those specifically shown. In operation, the IC 50 executes operational instructions that implement one or more of the applications (real-time or non-real-time) attributed to communication devices 125 as discussed above and in conjunction with FIGS. 1-3.

FIG. 5 is a schematic block diagram of an embodiment of RF transceiver 123, such as transceiver 73 or 73', in accordance with the present invention. The RF transceiver 123 includes an RF transmitter 129, and an RF receiver 127. The RF receiver 127 includes a RF front end 140, a down conversion module 142 and a receiver baseband processing module 144 that operate under the control of control signals 141. The RF transmitter 129 includes a transmitter baseband processing module 146, an up conversion module 148, and a radio transmitter front-end 150 that also operate under control of control signals 141.

As shown, the receiver and transmitter are each coupled to an antenna 171 and a diplexer (duplexer) 177, such as antenna interface 72 or 74, that converts the transmit signal 155 to produce outbound RF signal 170 and converts the inbound signal 152 to produce received signal 153. Alternatively, a transmit/receive switch can be used in place of diplexer 177. While a single antenna is represented, the receiver and transmitter may share a multiple antenna structure that includes two or more antennas. In another embodiment, the receiver and transmitter may share a multiple input multiple output (MIMO) antenna structure, diversity antenna structure, phased array or other controllable antenna structure that includes a plurality of antennas. Each of these antennas may be fixed, programmable, and antenna array or other antenna configuration.

In operation, the transmitter receives outbound data 162 from other portions of its a host device, such as a communication application executed by processing module 225 or other source via the transmitter processing module 146. The transmitter processing module 146 processes the outbound data 162 in accordance with a particular wireless communication standard (e.g., IEEE 802.11, Bluetooth, RFID, GSM, CDMA, et cetera) to produce baseband signal that may either a true baseband signal with no frequency offset or be a low intermediate frequency (IF) transmit (TX) signals that contains outbound data 162. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up-converted signals 166 based on a transmitter local oscillation.

The radio transmitter front end 150 includes a power amplifier and may also include a transmit filter module. The power amplifier amplifies the up-converted signals 166 to produce outbound RF signals 170, which may be filtered by the transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional bandpass filtration.

The receiver receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140, optional bandpass filtration of the inbound RF signal 152 and optionally controls the configuration of the antenna in response to one or more control signals 141 generated by processing module 225.

The down conversion module 142 includes a mixing section, an analog to digital conversion (ADC) module, and may also include a filtering and/or gain module. The mixing section converts the desired RF signal 154 into a down converted signal 156 that is based on a receiver local oscillation, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 includes, but is not limited to, digital intermediate frequency to baseband conversion, demodulation, demapping, depuncturing, decoding, and/or descrambling.

Further, configuration controller 221 generates one or more control signals 141 to configure or adapt the RF transceiver 123. In operation, configuration controller 221 generates control signals 141 to modify the transmit and/or receiver parameters of the RF transceiver 125 such as protocol parameters, data rates, modulation types, channel utilization methods, and other data parameters used by receiver processing module 144 and transmitter processing module 146, frequency bands, channels and bandwidths, filter settings, gains, power levels, ADC and DAC parameters, and other parameters used by RF front-end 140, radio transmitter front-end 150, down conversion module 142 and up conversion module 148, as well as antenna configurations used by antenna interface 171 to set the beam pattern, gain, polarization or other antenna configuration of the antenna.

In an embodiment of the present invention, the configuration controller receives channel data 143 from RF front end that indicates the receive conditions of the channel such as a receive signal strength, a signal to noise ratio, a signal to noise and interference ratio, and/or an automatic gain control signal or other data that indicates the current performance of the channel. In addition or in the alternative, configuration controller 221 can receive channel data 145 from receiver processing module 144. The channel data 145 can include a bit error rate, and/or a packet error rate that further indicates current channel conditions. Further, configuration controller 221 can receive requirements data corresponding to the stream of inbound data, wherein the requirements data includes a quality of service, a signal latency limit, and a signal content, for instance a signal type such as a real-time MPEG2 video stream, a real-time audio stream, a non-real-time data file, etc.

The configuration controller 221, receiver processing module 144 and transmitter processing module 146 can each be implemented with a dedicated or shared processing device. Such a processing device, for instance may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip. Such a memory device may be a read-only memory, random access memory, volatile memory, non-volatile memory, static memory, dynamic memory, flash memory, and/or any device that stores digital information. Note that when configuration controller 221, receiver processing module 144 and transmitter processing module 146 implement one or more of their functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In an embodiment of the present invention, configuration controller 221 includes a lookup table that generates control signals 141, based on the requirements data 223 and channel data 143 and 145. The control signals 141 can be analog signals, digital signals, discrete-time signals of other signals that control the modules of RF transceiver 123 to adapt to communication based on channel data 143 and 145 and requirements data 223. In particular, control signal 141 can be a plurality of individual signals or a single multidimensional signal that independently control the various modules of RF transceiver 123, that adjusts, adapts, controls or otherwise configures the operation of other similar transceivers 123 and the power management unit 95. Further details regarding particular conditions for generating control signals 141 will be discussed in conjunction with FIGS. 6-20 that follow.

FIG. 6 is a schematic block diagram of an embodiment of a transmitter processing module 146 in accordance with the present invention. In particular, transmitter processing module 146 processes outbound data in a plurality of transmitter stages to produce at least one baseband signal, such as baseband or low IF transmit signal 164. In the embodiment shown, these transmitter stages include scrambling stage 180, encoding stage 181, interleaving stage 182, mapping stage 183, and space/time coding stage 184. Transmitter processing module 146 further includes inverse FFT module 185, that can optionally be bypassed as well. In response to control signals 141, each of these stages can be individually and selectively bypassed by the multiplexers 186. In operation, the multiplexers 186 implement a switching matrix for selectively switching-in or bypassing each of the transmitter stages to place the transmitter processing module 146 in different configurations. Each of the transmitter stages can be individually powered via a dedicated power supply signal from power management unit 95. In this fashion, transmitter stages not in use can be powered down to conserve power.

In addition, each of the transmitter stages 180-184 can also be individually configured. In this fashion, control signal 141 can select from one of a plurality of scrambling methods, or use different scrambling seeds or encryption keys, can select from one of a plurality of encoding techniques, can select from one of a plurality of interleaving configurations, can select from one of a plurality of mappings and one of a plurality of space/time codings.

By selectively bypassing one or more transmitter stages and/or configuring each of these stages, transmitter processing module 146 can be configured in response to control signal 141 to one of a plurality of modulation modes such as a minimum shift keying mode, a binary phase shift keying mode, a quadrature phase shift keying mode, a quadrature amplitude modulation module, and a frequency shift keying mode, and to a selected one of a plurality of channel utilization modes, such as a orthogonal frequency division multiplexing mode, a coded orthogonal frequency division multiplexing mode, a time division multiplexing mode, a frequency division multiplexing mode, a code division multiplexing mode and a spread spectrum mode.

While transmitter processing module 146 is shown to produce a single baseband or low IF transmit signal 164, multiple baseband or low IF transmit signals can be generated by one or more redundant paths for applications such as where transmitter processing module 146 is coupled to an RF transmitter section that itself is configurable to generate a plurality of RF signal for transmission by a plurality of antennas. In this embodiment, the transmitter processing module 146 can be configurable in response to the control signal 141 to a selected one of a plurality of antenna modes, such as a single input single output mode, a multi-input single output mode, a single input multi-output mode and a multi-input multi-output mode.

In this fashion, configuration controller 221 can configure the channel utilization, antenna mode for efficient throughput based on the channel conditions reflected by channel data 143 and 145 and further based on the requirements data 223. For example, when excellent channel conditions are observed with high received power and low interference, particular redundancies and channel compensating features can be reduced or bypassed altogether to simplify the generation of the baseband or low IF transmit signal, and or to reduce power by reducing processing speeds and/or by disabling bypassed transmit stages.

FIG. 7 is a schematic block diagram of an embodiment of a receiver processing module 144 in accordance with the present invention. In a complementary fashion to transmitter processing module processing module 146, receiver processing module 144 includes a plurality of receiver stages that can be individually configured and selectively bypassed in response to control signal 141 to produce a stream of inbound data 160. In particular, these stages include a descrambling stage 194, an decoding stage 193, a deinterleaving stage 192, a demapping stage 191, and a space/time decoding stage 190 as well as FFT stage 189 that also may be selectively bypassed, based on the particular implementation. Each of the receiver stages can be individually powered via a dedicated power supply signal from power management unit 95. In this fashion, receiver stages not in use can be powered down to conserve power.

One or more down converted signals 156 can be processed in this fashion with the processed signals being combined in combination module 197 that performs summing, maximum ratio recombination or other combining to generate inbound data 160 in response thereto. Combination module 197, optionally generates channel data 145 by determining a packet error rate, bit error rate of other metric that indicates current channel conditions.

By selectively bypassing one or more transmitter stages and/or configuring each of these stages, receiver processing module 144 can be configured in response to control signal 141 to one of a plurality of modulation modes such as a minimum shift keying mode, a binary phase shift keying mode, a quadrature phase shift keying mode, a quadrature amplitude modulation module, and a frequency shift keying mode, and to a selected one of a plurality of channel utilization modes, such as a orthogonal frequency division multiplexing mode, a coded orthogonal frequency division multiplexing mode, a time division multiplexing mode, a frequency division multiplexing mode, a code division multiplexing mode and a spread spectrum mode.

In addition, one or more redundant paths can be selectively enabled or disabled in response to control signal 141 to configure the receiver processing module 144 to a selected one of a plurality of antenna modes such as a single input single output mode, a multi-input single output mode, a single input multi-output mode and a multi-input multi-output mode.

In this fashion, configuration controller 221 can configure the channel utilization, antenna mode and for efficient throughput based on the channel conditions reflected by channel data 143 and 145 and further based on the requirements data 223. For example, when excellent channel conditions are observed with high received power and low interference, particular redundancies and channel compensating features can be reduced or bypassed altogether to simplify the processing of the down converted signals 156 and or to reduce power by reducing processing speeds and/or by disabling bypassed receive stages.

FIG. 8 is a schematic block diagram of an embodiment of a RF transmitter section in accordance with the present invention. In particular, an RF transmitter section is shown, such as radio transmitter front end 150 and up conversion module 148. The RF transmitter section generates one or more RF signals 224 from the at least one baseband signal, such as baseband or low IF transmit signal 164, that are coupled to antenna module 214, such as antenna 171. Antenna module 214 can include a plurality of antennas driven by the RF signals 224. The antenna module 214 and the RF transmitter section are configurable via multiplexers 222 and demultiplexers 220 in response to the control signal 141 to a selected one of a plurality of antenna modes such as a single input single output mode, a multi-input single output mode, a single input multi-output mode and a multi-input multi-output mode.

In addition, a beamforming stage 204 is included for generating a plurality of beamformed upconverted signals with controlled amplitudes and phases that can be passed to a plurality of parallel power amplification sections 226 to generate the RF signals 224 for antenna module 214 for transmitting signals with directed beams as part of a phased array, to achieve spatial diversity, as part of a space/time coding, for transmission with controlled polarization, etc. In a low power mode, one or more power amplifier stages 226 can be shut down to save power.

In operation, the RF transmitter section is configurable to operate in a mixed signal mode of operation in response to control signal 141 by the selection of I-Q up conversion module 202 that operates based on the generation of in-phase (I) and quadrature-phase (Q) signals. Further, RF transmitter section is configurable to operate in a phase modulation mode of operation, in response to control signal 141 by selecting the phase modulation up-conversion module 200 that includes a phase locked loop or other phase or frequency modulator.

In an embodiment of the present invention, each of the modules of the RF transmitter section can be individually powered via dedicated power supply signals 228 from power management unit 95. In this fashion, modules not in use can be powered down to conserve power.

As previously discussed, the RF transmitter section includes a plurality of power amplifier stages 226 that, for instance, each correspond to one of the plurality of antennas in antenna module 214. Each power amplifier stage 226 is driven by a driver 206 or other pre-amplification stage. The power amplification stages 226 are configured in parallel, can be selectively bypassed in response to the control signal 141 for low power operation. As shown, each of the power amplifier stages 226 includes a linear power amplifier 208 and a nonlinear power amplifier 210. The linear power amplifier 208 and the nonlinear power amplifier 210 are independently selectable in response to control signal 141 based on the desired power level. Further, the linear power amplifier 208 can be a polar amplifier that operates on modulating signal 151 included in baseband or low IF transmit signal 164, to produce an amplitude modulated output.

In operation, configuration controller 221 generates control signal 141 based on channel data 143 and/or 145. Control signal 141 configures the RF transmitter section to produce one or more RF signals 226 having a selected power level, wherein the selected power level. If, for instance, RF transceiver 123 is communicating with an external device and is receiving an inbound RF signal 152 with high signal strength, the strength of received signal 153 can be used to generate channel data 143 that controls the gain of the RF front-end lower and that can be used by configuration controller 221, via control signal 141, to configure the RF transmitter section to a lower power mode of operation, by turning off or bypassing one or more of the power amplification stages. This can conserve power and possibly battery life, when the device that incorporates RF transceiver 123 is a mobile communication device, and can help reduce interference for other stations in range of RF transceiver 123 that may be communicating with the same access point or base station or that may otherwise be using the same spectrum.

Similarly, if for instance, RF transceiver 123 is communicating with an external device and is receiving an inbound RF signal 152 with low signal strength, that exhibits higher that acceptable bit error rate or packet error rate, or with strict QOS requirements, the configuration controller 221 can generate control signals, to select a higher power level for the RF signals 224, to engage more power amplification stages and transmit via more of all of the antennas of antenna module 214, to more carefully beamform the antenna pattern etc. This can help the outbound RF signal 170 reach an external device that may be distant, or that has a partially obstructed communication path to RF transceiver 123.

FIG. 9 is a schematic block diagram of an embodiment of a RF receiver section in accordance with the present invention. In particular, an RF receiver section, such as RF front-end 140 and down conversion module 142 is shown coupled to antenna module 214. The RF receiver section that generates one or more downconverted signals 156 from at least one received RF signal generated by antenna module 214. Each of the modules of the RF receiver section can be individually powered via dedicated power supply signals 238 from power management unit 95. In this fashion, modules not in use can be powered down to conserve power.

The RF receiver section includes a plurality of RF receiver stages 236 that are configured in parallel, and wherein each of the plurality of RF receiver stages can be selectively enabled by selectively powering these devices via dedicated supply signals. For instance, the RF receiver section can be configured in one of a plurality of antenna modes such as a single input single output mode, a multi-input single output mode, a single input multi-output mode and a multi-input multi-output mode. In operation, power management unit 95 is responsive to control signal 141 to selectively and individual stages of the circuit that are actually in use while powering down the other stages. Channel data generator 236 generates channel data 143 based on a measurement such as a receive signal strength, a signal to noise ratio, a signal to noise and interference ratio, automatic gain control data and/or other data that indicates the conditions of the particular channel being received.

As shown, the RF receiver stages 236 include a low noise amplifier 232 and one or more of the RF receiver stages 236 further include a blocking circuit 234 that can be selectively engaged in response to the control signal 141 to provide interference blocking via filtration, cancellation or other blocking technique. In this fashion, when high interference is indicated via channel data 143 and/or channel data 145, one or more blocking circuits 234 can be selectively engaged. In an embodiment of the present invention, the configuration controller 221 can selectively engage the blocking circuits and monitor the channel data 143 and/or 145 to determine if channel conditions are better with or without each of the individual blocking circuits 234 being engaged or disengaged.

The RF receiver section includes a plurality of down conversion modules 230, such as down conversion module 142, and the RF receiver section is configurable, in response to the control signal 141, to generate a plurality of downconverted signals from a plurality of RF signals.

FIG. 10 is a schematic block diagram of an embodiment of a configurable power supply in accordance with the present invention. In particular, a power supply 240 is shown that can include power management unit 95 for supplying one or more power supply signals $Vdd_{RF}$ for powering a configurable RF section 244, such as the RF transmitter section of FIG. 8 and the RF receiver section of FIG. 9. In addition, power supply 240 generates one or more power supply signals $Vdd_{BB}$ for powering a configurable baseband processing module 242, such as the transmitter processing module 146 and the receiver processing module 144. In operation, power supply 240 $Vdd_{RF}$ and $Vdd_{BB}$ in accordance with a plurality of power consumption parameters and adjusts at least one of the plurality of power consumption parameters based on the control signal 241, such as control signal 141. In an embodiment of the present invention, individual modules within the configurable RF section 244 and configurable baseband processing module 242 can be individually powered via dedicated power supply signals $Vdd_{RF}$ and $Vdd_{BB}$ from power supply 240. In this fashion, modules not in use can be powered down to conserve power.

In an embodiment of the present invention, the power supply 240 can further adjust power consumption parameters such as a receiver supply signal voltage, a receiver supply signal current, a transmitter supply signal voltage, and a transmitter supply signal current included in $Vdd_{RF}$ and $Vdd_{BB}$. In this fashion, as the configuration controller 221 configures the RF and baseband sections of the receiver and transmitter, the control signals 241 contemporaneously configures the power supply 240 to adjust the power supply signals $Vdd_{RF}$ and $Vdd_{BB}$ to conform with changing power requirements of the configurable BB processing module 242 and the configurable RF section 244.

For instance, power supply 240 adjusts the power supply signals $Vdd_{RF}$ and $Vdd_{BB}$ in response to the control signal 241 to correspond to a selected one of a plurality of antenna modes such as a single input single output mode, a multi-input single output mode, a single input multi-output mode and a multi-input multi-output mode. In another example, power supply 240 adjusts the power supply signals $Vdd_{RF}$ and $Vdd_{BB}$ in response to the control signal 241 to correspond to a selected one of a plurality of modulation modes such as a minimum shift keying mode, a binary phase shift keying mode, a quadrature phase shift keying mode, a quadrature amplitude modulation module, and a frequency shift keying mode. In a further example, power supply 240 adjusts the power supply signals $Vdd_{RF}$ and $Vdd_{BB}$ in response to the control signal 241 to correspond to a selected one of a plurality of channel utilization modes such as a orthogonal frequency division multiplexing mode, a coded orthogonal frequency division multiplexing mode, a time division multiplexing mode, a frequency division multiplexing mode, a code division multiplexing mode and a spread spectrum mode. Also, power supply 240 can adjust the power supply signals $Vdd_{RF}$ and $Vdd_{BB}$ in response to the control signal 241 to correspond to a selected one of a plurality of power amplification modes such as a linear power amplification mode, a nonlinear power amplification mode, a low power mode, and a polar power amplification mode.

FIG. 11 is a schematic block diagram of an embodiment of power management circuitry in accordance with the present invention. In particular, selected modules of IC 50 are shown that include RF transceiver 123 and configuration controller 221. Off-chip power management circuit 95 receives the control signal 241 and generates a plurality of power supply signals 254 to power off-chip modules and on-chip modules as these modules are in use such as one or more transmitter power supply signals 252 and one or more receiver supply signals 250. As discussed in conjunction with FIG. 10, transmitter supply signal 252 and receiver supply signal 250 (including one or more power supply signals $Vdd_{RF}$ and $Vdd_{BB}$) can be adjusted based on the control signal 141 and the particular mode of operation corresponding thereto.

For example, the various operational modes of RF transmitter 129 and RF receiver 127 can include a low, medium and high power ranges of power levels, transmitter power amplification modes, antenna modes, modulation modes and channel utilization modes. Control signal 141 can indicate to the off-chip power management circuit 95 the selected mode of the RF transmitter 129 so that off-chip power management circuit 95 can supply the necessary power supply signals 254 to meet the power demands of the selected mode of operation. This methodology allows power to be generated for the RF transmitter and/or the various modules contained therein, only as required to address the current power mode in use.

Also, if communication device 10 or 30 is using certain peripheral devices and/or certain interfaces or modules at a given time, off-chip power management circuit 95 can be commanded to supply only those power supply signals 254 that are required based on the peripheral devices, interfaces and/or other modules that are in use. Further, if a USB device is coupled to wireline port 64, then a power mode command can be sent to off-chip power management module 95 to generate a power supply signal 204 that supplies a power supply voltage, (such as a 5 volt, 8 milliamp supply voltage) to the wireline port 64 in order to power the USB device or devices connected thereto. In another example, if the communication device 10 includes a mobile communication device that operates in accordance with a GSM or EDGE wireless protocol, the off-chip power management circuit 95 can generate supply voltages for the baseband and RF modules of the transceiver only when the transceiver is operating.

Further, peripheral devices, such as the camera 76, memory 54, keypad/keyboard 58, microphone 60, display 56, and speaker 62 can be powered when these peripheral devices are attached (to the extent that they can be detached) and to the extent that these devices are currently in use by the application.

The power management features of the present invention operates based on the configuration controller 221 determining, a power mode that corresponds to the other operational modes of the IC 50. The configuration controller 221, via look-up table, calculation or other processing routine, determines the power mode by determining the particular power supply signals required to be generated based on the devices in use and optionally their own power states.

The off-chip power management circuit 95 can be implemented as a multi-output programmable power supply, that receives the control signal 141 and generates and optionally routes the power supply signals 254 to particular ports, pins or pads of IC 50 or directly to peripheral devices via a switch matrix, as commanded based on the control signal 141. In an embodiment of the present invention, the control signal 141 is decoded by the off-chip power management module to determine the particular power supply signals to be generated, and optionally—their characteristics such as voltage, current and/or current limit.

In an embodiment of the present invention, IC 50 couples the control signal 141 to the off-chip power management circuit 95 via one or more dedicated digital lines that comprise a parallel interface. Further, the IC 50 can couple the control signal 141 to the off-chip power management circuit via a serial communication interface such as an I²C interface, serial/deserializer (SERDES) interface or other serial interface.

FIG. 12 is a schematic block diagram of another embodiment of a power management unit in accordance with the present invention. In particular, on-chip power management circuit 95' operates in a similar fashion to off-chip power management unit 95 to generate power supply signals 255 that are similar to power supply signals 254. On-chip power management circuit 95' includes one or more DC-DC converters, voltage regulators, current regulators or other power supplies for supplying the IC 50, and optionally the other components of communication device 10 and/or its peripheral devices with supply voltages and or currents (collectively power supply signals) that may be required to power these devices. On-chip power management circuit 95' can operate from one or more batteries, line power and/or from other power sources, not shown as discussed in conjunction with FIG. 11.

FIG. 13 is a schematic block diagram of another embodiment of a power management unit in accordance with the present invention. In particular, a MIMO configuration is shown for transceiver 73 . . . 73' that includes multiple RF transceivers 350, such as RF transceiver 123, that transmits outbound data 162 via each transceiver 350 and that generates inbound data 160 by combining inbound data from each of the transceivers 350 via maximum ratio recombination or other processing technique. Each transceiver includes a RF transmitter, such as RF transmitter 129, and an RF receiver, such as RF receiver 127 that share a common antenna, that share a common antenna structure that includes multiple antennas or that that employ separate antennas for the transmitter and receiver. In this configuration, configuration controller 221 generates control signals 141 based on requirements data 223 and channel data 147, such as channel data 143 and 145, received from each of the transceivers 350.

FIG. 14 is a flow chart of an embodiment of a method in accordance with the present invention. In particular, a method is presented for use in conjunction with one or more of the functions and features described in conjunction with FIGS. 1-13. In step 400, a receiver processing module is configured in response to a control signal to selectively bypass at least one of a plurality of receiver processing stages. In step 402, a transmitter processing module is configured in response to the control signal to selectively bypass at least one of the plurality of transmitter processing stages.

In an embodiment of the present invention, the transceiver further includes a plurality of antennas, and wherein the transmitter processing module and the receiver processing module are configured to a selected one of a plurality of antenna modes, wherein the plurality of antenna modes includes a single input single output mode, a multi-input single output mode, a single input multi-output mode and/or a multi-input multi-output mode. The transmitter processing module and the receiver processing module can be configured to a selected one of a plurality of modulation modes, wherein the plurality of modulation modes includes a minimum shift keying mode, a binary phase shift keying mode, a quadrature phase shift keying mode, a quadrature amplitude modulation module, and/or a frequency shift keying mode. The transmitter processing module and the receiver processing module can also be configured to a selected one of a plurality of channel utilization modes, wherein the plurality of channel utilization modes includes an orthogonal frequency division multiplexing mode, a coded orthogonal frequency division multiplexing mode, a time division multiplexing mode, a frequency division multiplexing mode, a code division multiplexing mode and/or a spread spectrum mode.

FIG. 15 is a flow chart of an embodiment of a method in accordance with the present invention. In particular, a method is presented for use in conjunction with one or more of the functions and features described in conjunction with FIGS. 1-14. In step 410, the plurality of RF receiver stages are selectively enabled in response to a control signal. In step 412, the configurable RF transmitter section is configured to operate in one of: a mixed signal mode of operation and a phase modulation mode of operation, in response to the control signal.

FIG. 16 is a flow chart of an embodiment of a method in accordance with the present invention. In particular, a method is presented for use in conjunction with one or more of the functions and features described in conjunction with FIGS. 1-15. In step 420, a plurality of antennas coupled to the RF receiver section and the RF transmitter section, are configured in response to the control signal to a selected one of a plurality of antenna modes, wherein the plurality of antenna modes includes a single input single output mode, a multi-input single output mode, a single input multi-output mode and/or a multi-input multi-output mode.

FIG. 17 is a flow chart of an embodiment of a method in accordance with the present invention. In particular, a method is presented for use in conjunction with one or more of the functions and features described in conjunction with FIGS. 1-16. In step 430, a beamforming stage for generating a plurality of beamformed upconverted signals the corresponding plurality of antennas is selectively enabled for.

FIG. 18 is a flow chart of an embodiment of a method in accordance with the present invention. In particular, a method is presented for use in conjunction with one or more of the functions and features described in conjunction with FIGS. 1-17. In step 440, interference blocking is selectively enabled in at least one of the plurality of RF receiver stages.

FIG. 19 is a flow chart of an embodiment of a method in accordance with the present invention. In particular, a method is presented for use in conjunction with one or more of the functions and features described in conjunction with FIGS. 1-18. In step 450, one of a plurality of power amplification modes is selected, the plurality power amplification modes including a linear power amplification, a nonlinear power amplification, a low power mode, and/or a polar power amplification mode.

FIG. 20 is a flow chart of an embodiment of a method in accordance with the present invention. In particular, a method is presented for use in conjunction with one or more of the functions and features described in conjunction with FIGS. 1-19. In step 460, a stream of inbound data is generated from at least one received RF signal via an RF receiver that is configurable in response to a control signal. In step 462, at least one RF signal is generated from a stream of outbound data via an RF transmitter section that is configurable in response to the control signal. In step 464, at least one receiver supply signal and at least on transmitter supply signal are generated in accordance with a plurality of power consumption parameters. In step 466, a control signal is generated based on channel data. In step 468, at least one of the plurality of power consumption parameters is adjusted based on the control signal.

In an embodiment of the present invention, the plurality of power consumption parameters includes a receiver supply signal voltage, a receiver supply signal, a transmitter supply signal voltage, and/or a transmitter supply signal current.

The RF transceiver and the RF transmitter can be configurable in response to the control signal to a selected one of a plurality of modulation modes, wherein the plurality of modulation modes includes a minimum shift keying mode, a binary phase shift keying mode, a quadrature phase shift keying mode, a quadrature amplitude modulation module, and/or a frequency shift keying mode and wherein the adjusting of the at least one of the plurality of power consumption parameters is based on the selected one of the plurality of modulation modes.

The RF transceiver and the RF transmitter can be configurable in response to the control signal to a selected one of a plurality of channel utilization modes, wherein the plurality of channel utilization modes includes an orthogonal frequency division multiplexing mode, a coded orthogonal frequency division multiplexing mode, a time division multiplexing mode, a frequency division multiplexing mode, a code division multiplexing mode and/or a spread spectrum mode, and wherein the adjusting of the at least one of the plurality of power consumption parameters is based on the selected one of the plurality of channel utilization modes.

The control signal can generated based on channel data that includes a receive signal strength, a signal to noise ratio, a signal to noise and interference ratio, automatic gain control data, a bit error rate, a packet error rate, a quality of service, a signal latency limit, and/or a signal content.

The RF transmitter can be configurable to one of a plurality of power amplification modes and adjusting the plurality of power consumption parameters is based on the selected one of the plurality of power amplification modes. The plurality or power amplification modes can include a linear power amplification mode, a nonlinear power amplification mode, a low power mode, and/or a polar power amplification mode.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A configurable receiver comprising:
   an RF receiver section that generates at least one downconverted signal from at least one received RF signal, wherein the RF receiver section includes a plurality of RF receiver stages configured in parallel, and wherein each of the plurality of RF receiver stages is can be selectively enabled in response to a control signal and wherein at least one of the plurality of RF receiver stages includes a blocking circuit that can be selectively engaged in response to the control signal to provide interference blocking; and
   a receiver processing module, coupled to the RF receiver section, that processes at least one downconverted signal to produce a stream of inbound data.

2. The configurable receiver of claim 1, further comprising:
   a plurality of antennas, coupled to the RF receiver section for generating the at least one received RF signal;
   wherein the plurality of antennas and the RF receiver section are configurable in response to the control signal to a selected one of a plurality of antenna modes, wherein the plurality of antenna modes includes at least one of: a single input single output mode, a multi-input single output mode, a single input multi-output mode and a multi-input multi-output mode.

3. The configurable receiver of claim 1, wherein each of the plurality of RF receiver stages includes a blocking circuit that can be selectively engaged in response to the control signal to provide interference blocking.

4. The configurable receiver of claim 1, the RF receiver section includes a plurality of down conversion modules, and the RF receiver section is configurable, in response to the control signal, to generate a plurality of downconverted signals from a plurality of RF signals.

5. The configurable receiver of claim 1 wherein the receiver processing module, processes the at least one downconverted signal in a plurality of receiver stages to produce a stream of inbound data, and wherein the receiver processing module is configurable in response to a control signal to selectively bypass at least one of the plurality of processing stages.

6. A configurable transmitter comprising:
   a transmitter processing module that processes outbound data to produce at least one baseband signal; and an RF transmitter section, coupled to the transmitter processing module, that generates at least one RF signal from the at least one baseband signal, wherein the RF transmitter section is configurable to operate in a mixed signal mode of operation and a phase modulation mode of operation, in response to a control signal wherein the RF transmitter module includes:
  a phase modulation up converter for upconverting the at least one baseband signal in a phase modulation mode of operation; and
  a mixed signal up conversion module for upconverting the at least one baseband signal in a mixed signal mode of operation.

7. The configurable transmitter of claim 6 further comprising
  a plurality of antennas, coupled to the RF transmitter section for transmitting the at least one RF signal;
  wherein the plurality of antennas and the RF transmitter section are configurable in response to the control signal to a selected one of a plurality of antenna modes, wherein the plurality of antenna modes includes at least one of: a single input single output mode, a multi-input single output mode, a single input multi-output mode and a multi-input multi-output mode.

8. The configurable transmitter of claim 6 further comprising
  a plurality of antennas, coupled to the RF transmitter section for transmitting the at least one RF signal;
  wherein the RF transmitter section includes a beamforming stage for generating a plurality of beamformed upconverted signals for the corresponding plurality of antennas.

9. The configurable transmitter of claim 6 wherein the RF transmitter section includes a plurality of power amplifier stages configured in parallel, and wherein each of the plurality of power amplifier stages can be selectively bypassed in response to the control signal for low power operation.

10. The configurable transmitter of claim 9 wherein the plurality of power amplifier stages each include a linear power amplifier and a nonlinear power amplifier, and wherein the linear power amplifier and the nonlinear power amplifier are independently selectable.

11. The configurable transmitter of claim 9 wherein the plurality of power amplifier stages each include a polar amplifier that operates based on the baseband signal.

12. A method for use in a transceiver that includes an RF receiver section having a plurality of RF receiver stages configured in parallel, and a configurable RF transmitter section, the method comprising
  selectively enabling the plurality of RF receiver stages, in response to a control signal;
  selecting one of a plurality of power amplification modes, the plurality power amplification modes including a linear power amplification and a nonlinear power amplification; and
  configuring the configurable RF transmitter section to operate in one of: a mixed signal mode of operation and a phase modulation mode of operation, in response to the control signal.

13. The method of claim 12, further comprising:
  configuring a plurality of antennas coupled to the RF receiver section and the RF transmitter section in response to the control signal to a selected one of a plurality of antenna modes, wherein the plurality of antenna modes includes at least one of: a single input single output mode, a multi-input single output mode, a single input multi-output mode and a multi-input multi-output mode.

14. The method of claim 13 further comprising:
  selectively enabling a beamforming stage for generating a plurality of beamformed upconverted signals for the corresponding plurality of antennas.

15. The method of claim 12, further comprising:
  selectively enabling interference blocking in at least one of the plurality of RF receiver stages.

16. The method of claim 12 wherein the plurality power amplification modes further include a low power mode.

17. The method of claim 12 wherein the plurality power amplification modes further include a polar power amplification mode.

* * * * *

UNITED STATES PATENT AND TRADEMARK OFFICE
CERTIFICATE OF CORRECTION

PATENT NO. : 8,121,557 B2
APPLICATION NO. : 12/326229
DATED : February 21, 2012
INVENTOR(S) : Ahmadreza Rofougaran It is certified that error appears in the above-identified patent and that said Letters Patent is hereby corrected as shown below:

In the Claims:

Col. 18, line 31, in claim 1: replace "is can be" with --can be--
Col. 19, lines 14-15, in claim 7: after "comprising" insert --:--
Col. 19, lines 24-25, in claim 8: after "comprising" insert --:--
Col. 20, line 7, in claim 12: after "comprising" insert --:--
Col. 20, line 34, in claim 16: replace "plurality power" with --plurality of power--
Col. 20, line 36, in claim 17: replace "plurality power" with --plurality of power--

Signed and Sealed this
Thirtieth Day of April, 2013

Teresa Stanek Rea
*Acting Director of the United States Patent and Trademark Office*